United States Patent
Pinder et al.

(10) Patent No.: US 7,861,082 B2
(45) Date of Patent: Dec. 28, 2010

(54) VALIDATING CLIENT-RECEIVERS

(76) Inventors: Howard G. Pinder, 4317 Stilson Cir., Norcross, GA (US) 30092; Anthony J. Wasilewski, 10680 Wren Ridge Rd., Alpharetta, GA (US) 30022; Mark D. Mattox, 1311 Mickendree Park Ct., Lawrenceville, GA (US) 30043

( * ) Notice: Subject to any disclaimer, the term of this patent is extended or adjusted under 35 U.S.C. 154(b) by 936 days.

(21) Appl. No.: 10/873,805

(22) Filed: Jun. 22, 2004

(65) Prior Publication Data

US 2004/0237100 A1 Nov. 25, 2004

Related U.S. Application Data

(63) Continuation-in-part of application No. 10/382,944, filed on Mar. 6, 2003, now Pat. No. 7,181,010, which is a continuation-in-part of application No. 10/154,495, filed on May 24, 2002, now Pat. No. 6,748,080.

(51) Int. Cl.
*H04L 9/32* (2006.01)
(52) U.S. Cl. .................................................. 713/168
(58) Field of Classification Search ................... 725/31; 713/168
See application file for complete search history.

(56) References Cited

U.S. PATENT DOCUMENTS

| | | | |
|---|---|---|---|
| 5,742,677 A | 4/1998 | Pinder et al. | |
| 5,742,686 A | 4/1998 | Finley | |
| 5,796,829 A | 8/1998 | Newby et al. | |
| 5,870,474 A * | 2/1999 | Wasilewski et al. | ......... 380/211 |
| 5,872,846 A | 2/1999 | Ichikawa | |
| 5,933,503 A | 8/1999 | Schell et al. | |
| 5,940,391 A | 8/1999 | Malkin | |
| 5,961,603 A | 10/1999 | Kunkel | |
| 5,987,572 A | 11/1999 | Weidner et al. | |
| 5,999,970 A | 12/1999 | Krisbergh et al. | |
| 6,005,938 A | 12/1999 | Banker et al. | |

(Continued)

FOREIGN PATENT DOCUMENTS

EP     0 782 296     7/1997

(Continued)

OTHER PUBLICATIONS

"Explorer 8300 Series Digital Recorder" ScientificAtlanta.com [online] Oct. 2005, XP002459851, Retrieved from the internet: URL:http://www.cisco.com/application/pdf/en/us/guest/products/ps8613/c1650/cdccont_0900aecd806c6913.pdf [retrieved on Nov. 22, 2007].

(Continued)

*Primary Examiner*—Edan Orgad
*Assistant Examiner*—Harris C Wang
(74) *Attorney, Agent, or Firm*—Merchant & Gould (57) ABSTRACT

In a subscriber television system having a headend, a server, and plurality of client-receivers, the server, which is remote from the headend, is adapted to receive a validation-message from one or more client-receivers. The validation-message includes content and an authentication-token. The server validates that the sender of the validation-message is a valid client-receiver of the subscriber television system using an authentication-token and a validator that is known to both the server and to at least one of the client-receivers.

7 Claims, 6 Drawing Sheets

U.S. PATENT DOCUMENTS

| | | |
|---|---|---|
| 6,020,982 A | 2/2000 | Yamauchi et al. |
| 6,098,056 A | 8/2000 | Rusnak et al. |
| 6,105,134 A | 8/2000 | Pinder et al. |
| 6,157,719 A | 12/2000 | Wasilewski et al. |
| 6,173,400 B1 * | 1/2001 | Perlman et al. ............ 713/172 |
| 6,185,625 B1 | 2/2001 | Tso et al. |
| 6,229,895 B1 | 5/2001 | Son et al. |
| 6,230,269 B1 * | 5/2001 | Spies et al. ................ 713/182 |
| 6,246,767 B1 | 6/2001 | Akins, III et al. |
| 6,252,964 B1 | 6/2001 | Wasilewski et al. |
| 6,292,568 B1 | 9/2001 | Akins, III et al. |
| 6,345,307 B1 * | 2/2002 | Booth ........................ 709/247 |
| 6,356,971 B1 | 3/2002 | Katz et al. |
| 6,366,987 B1 | 4/2002 | Tzelnic et al. |
| 6,378,130 B1 | 4/2002 | Adams |
| 6,424,714 B1 | 7/2002 | Wasilewski et al. |
| 6,424,717 B1 | 7/2002 | Pinder et al. |
| 6,459,427 B1 | 10/2002 | Mao et al. |
| 6,484,318 B1 | 11/2002 | Shioda et al. |
| 6,510,519 B2 | 1/2003 | Wasilewski et al. |
| 6,516,412 B2 | 2/2003 | Wasilewski et al. |
| 6,526,508 B2 | 2/2003 | Akins, III et al. |
| 6,532,593 B1 | 3/2003 | Moroney |
| 6,543,053 B1 | 4/2003 | Li et al. |
| 6,549,577 B2 | 4/2003 | Florencio et al. |
| 6,550,008 B1 * | 4/2003 | Zhang et al. ................ 713/155 |
| 6,560,340 B1 | 5/2003 | Akins, III et al. |
| 6,574,609 B1 | 6/2003 | Downs et al. |
| 6,636,953 B2 | 10/2003 | Yuasa et al. |
| 6,727,944 B1 | 4/2004 | Adachi |
| 6,744,892 B2 | 6/2004 | Akins, III et al. |
| 6,748,080 B2 | 6/2004 | Russ et al. |
| 6,804,357 B1 | 10/2004 | Ikonen et al. |
| 6,937,729 B2 | 8/2005 | Akins, III et al. |
| 6,963,972 B1 | 11/2005 | Chang et al. |
| 6,971,008 B2 | 11/2005 | Wasilewski et al. |
| 7,062,658 B1 | 6/2006 | Cheriton et al. |
| 7,065,216 B1 | 6/2006 | Benaloh et al. |
| 7,107,416 B2 | 9/2006 | Stuart et al. |
| 7,146,388 B2 | 12/2006 | Stakutis et al. |
| 7,155,609 B2 | 12/2006 | Chan et al. |
| 7,181,010 B2 | 2/2007 | Russ et al. |
| 7,200,868 B2 | 4/2007 | Mattox et al. |
| 7,212,725 B2 | 5/2007 | Gunji et a |
| 7,233,959 B2 | 6/2007 | Kanellos et al. |
| 7,363,326 B2 | 4/2008 | Margolus |
| 7,505,592 B2 | 3/2009 | Russ et al. |
| 7,602,913 B2 | 10/2009 | Wasilewski |
| 7,602,914 B2 | 10/2009 | Wasilewski |
| 7,630,499 B2 | 12/2009 | Wasilewski |
| 7,650,442 B2 | 1/2010 | Ashley et al. |
| 2001/0006400 A1 | 7/2001 | Kubo et al. |
| 2001/0049824 A1 | 12/2001 | Baker et al. |
| 2002/0013772 A1 | 1/2002 | Peinado |
| 2002/0018130 A1 | 2/2002 | Suemoto et al. |
| 2002/0026582 A1 | 2/2002 | Futamura et al. |
| 2002/0044658 A1 | 4/2002 | Wasilewski et al. |
| 2002/0094084 A1 | 7/2002 | Wasilewski et al. |
| 2002/0099663 A1 | 7/2002 | Yoshino et al. |
| 2002/0116708 A1 | 8/2002 | Morris et al. |
| 2002/0144067 A1 | 10/2002 | Jeong |
| 2002/0146237 A1 | 10/2002 | Safadi ........................ 386/94 |
| 2002/0184457 A1 | 12/2002 | Yuasa et al. |
| 2002/0199190 A1 | 12/2002 | Su |
| 2003/0005446 A1 * | 1/2003 | Jaff et al. ...................... 725/51 |
| 2003/0005454 A1 | 1/2003 | Rodriguez et al. |
| 2003/0009668 A1 | 1/2003 | Chan |
| 2003/0028890 A1 | 2/2003 | Swart |
| 2003/0093680 A1 | 5/2003 | Astley et al. |
| 2003/0110234 A1 | 6/2003 | Egli et al. |
| 2003/0161617 A1 | 8/2003 | Um et al. |
| 2003/0188164 A1 | 10/2003 | Okimoto et al. |
| 2003/0200337 A1 | 10/2003 | Jabri et al. |
| 2004/0039911 A1 | 2/2004 | Oka et al. |
| 2004/0045030 A1 | 3/2004 | Reynolds et al. |
| 2004/0052377 A1 | 3/2004 | Mattox et al. |
| 2004/0068739 A1 | 4/2004 | Russ |
| 2004/0117831 A1 | 6/2004 | Ellis et al. |
| 2004/0128499 A1 | 7/2004 | Peterka et al. |
| 2004/0187014 A1 | 9/2004 | Molaro |
| 2004/0193921 A1 | 9/2004 | Byrne |
| 2004/0236804 A1 | 11/2004 | Bots et al. |
| 2004/0237100 A1 | 11/2004 | Pinder et al. |
| 2005/0076066 A1 | 4/2005 | Stakutis et al. |
| 2005/0080497 A1 | 4/2005 | Rao |
| 2005/0091173 A1 | 4/2005 | Alve |
| 2005/0100162 A1 | 5/2005 | Alve et al. |
| 2005/0102513 A1 | 5/2005 | Alve |
| 2005/0111835 A1 | 5/2005 | Friel et al. |
| 2005/0223414 A1 | 10/2005 | Kenrich et al. |
| 2005/0232593 A1 | 10/2005 | Kanai |
| 2005/0237396 A1 | 10/2005 | Hagiwara et al. |
| 2005/0240708 A1 | 10/2005 | Shaver et al. |
| 2006/0013566 A1 | 1/2006 | Nakamura |
| 2006/0020786 A1 | 1/2006 | Helms et al. |
| 2006/0039256 A1 | 2/2006 | Nakamura et al. |
| 2006/0039559 A1 | 2/2006 | Wasilewski |
| 2006/0039560 A1 | 2/2006 | Wasilewski |
| 2006/0041905 A1 | 2/2006 | Wasilewski |
| 2006/0072752 A1 | 4/2006 | Nakano et al. |
| 2006/0074807 A1 | 4/2006 | Gauba et al. |
| 2006/0109854 A1 | 5/2006 | Cancel |
| 2006/0156382 A1 | 7/2006 | Motoyama |
| 2006/0179478 A1 | 8/2006 | Han et al. |
| 2006/0184733 A1 | 8/2006 | Yamamoto et al. |
| 2006/0200865 A1 | 9/2006 | Leake, Jr. et al. |
| 2007/0055390 A1 | 3/2007 | Simon et al. |
| 2007/0130254 A1 | 6/2007 | Russ et al. |
| 2007/0245024 A1 | 10/2007 | Prus et al. |
| 2007/0277205 A1 | 11/2007 | Grannan |
| 2007/0294178 A1 | 12/2007 | Pinder et al. |
| 2008/0002951 A1 | 1/2008 | Russ et al. |
| 2008/0005030 A1 | 1/2008 | Schlarb et al. |
| 2008/0005204 A1 | 1/2008 | Prus et al. |
| 2008/0005497 A1 | 1/2008 | Prus et al. |
| 2008/0022304 A1 | 1/2008 | Prus et al. |
| 2008/0137867 A1 | 6/2008 | Wasilewski |
| 2009/0089369 A1 | 4/2009 | Russ |

FOREIGN PATENT DOCUMENTS

| | | |
|---|---|---|
| EP | 1 014 715 | 6/2000 |
| EP | 1 213 919 | 12/2002 |
| FR | 2 779 599 A | 12/1999 |
| GB | 2 403 586 A | 1/2005 |
| KR | 10-2003-0037098 | 5/2003 |
| KR | 10-2004-0062662 | 7/2004 |
| WO | WO 2000/11840 | 3/2000 |
| WO | WO 00/51041 | 8/2000 |
| WO | WO 01/18807 A2 | 3/2001 |
| WO | WO 01/75876 A | 10/2001 |
| WO | WO 01/82588 | 11/2001 |
| WO | WO 02/097997 | 12/2002 |
| WO | WO 2004/098190 | 11/2004 |
| WO | WO 2005/029843 | 3/2005 |
| WO | WO 2005/029852 | 3/2005 |
| WO | WO 2005/091626 | 9/2005 |
| WO | WO 2005/101411 | 10/2005 |
| WO | WO 2006/038204 | 4/2006 |
| WO | WO 2006/066052 A2 | 6/2006 |
| WO | WO 2008/005699 A2 | 1/2008 |

WO WO 2008/005700 A2 1/2008

OTHER PUBLICATIONS

Gilo: "Do It Yourself Making an External Hard Drive Guide" Notebookreview.com, [online], Jun. 2, 2006, XP002459852, Retrieved from the internet: URL:http://www.notebookreview.com/default.asp?newsID=2972 [retrieved on Nov. 22, 2007].

U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.

U.S. Appl. No. 10/920,841, filed Aug. 18, 2004, Entitled "Retrieval and Transfer of encrypted Hard Drive Content from Digital Video Receiver Set Top Box Utilizing Second Digital Video Receiver Set Top Box," Inventor: Wasilewski, Anthony.

U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.

U.S. Appl. No. 11/405,205, filed Apr. 17, 2006, Entitled "System and Method for Prioritizing the Storage Location of Media Data," Inventors: Prus et al.

U.S. Appl. No. 11/428,367, filed Jun. 30, 2006, Entitled "Secure Escrow and Recovery of Media Device Content Keys," Inventors: Schlarb et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors: Prus et al.

U.S. Appl. No. 11/428,356, filed Jun. 30, 2006, Entitled "System and Method for Applying Retention Rules," Inventors: Prus et al.

U.S. Appl. No. 11/428,357, filed Jun. 30, 2006, Entitled "Digital Media Device having Selectable Media Content Storage Locations," Inventors: Prus et al.

U.S. Appl. No. 11/428,365, filed Jun. 30, 2006, Entitled "Digital Media Device having Media Content Transfer Capability," Inventors: Russ et al.

U.S. Appl. No. 11/671,506, filed Feb. 6, 2007, Entitled "Apparatus for Entitling and Transmitting Service Instances to Remote Client Devices," Inventors: Russ et al.

U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.

Menezes et al.: "Handbook of Applied Cryptography" Handbook of applied Cryptography, CRC Press Series on Discrete Mathematics and Its Applications, Boca Raton, FL CRC Press, 1997, pp. 546, 567-570, XP002356115 ISBN: 0-8493-8523-7.

WinFtp, Sep. 8, 2005, pp. 1-7, http://www.download.cnet.com/WinFtp-Client/3000-2160_4-10429297.html.

Old Apps, ("Old Version of WinSCP"), Jan. 13, 2003, pp. 1-3, http://www.oldapps.com/WinSCP.php?old_winscp=2.

Blackcurrant, (Delete Files Across a Network), May 11, 2005, pp. 1-2, http://techrepublic.com.com/5208-6230-0.html?forumID=3&threadID=173478&start=0.

TiVO.com, "What is TiVo?", Jan. 14, 2005, pp. 1-12, http://web.archive.org/web/20050114053806/http://www.tivo.com/1.0.asp.

Matt Haughey, "PC to Tivo Playback released", Oct. 24, 2005, pp. 1-13, htt://web .archive.org/web/20051024002825/http://pvrblog.com/pvr/2005/08/pc_to_tivo_play.html.

Craig Ellison, TiVo Series 2", Jan. 13, 2004, pp. 1-6, http://www.pcmag.com/article2/0,2817,1649659,00.asp.

Boston College, "Copying Files to a USB Drive or External Hard Drive", Nov. 8, 2005, pp. 1-5, http://web.archive.org/web/20060227003853/http://www.bc.edu/offices/help/meta-elements/doc/articles/html/HW-usb-drive-copy.shtml.

Jan Smith, "Files & Folders: Removable Media", Oct. 13, 2004, pp. 1-12, http://web.archive.org/web/20041027194919/http://www.jegsworks.com/Lessons/win/filesandfolders/step-removabledisk.htm.

Picker, "The Digital Video Recorder: Unbundling Advertising and Content". Professor of Commercial Law, The University of Chicago Law School. Senior Fellow, The Computation Institute of the University of Chicago and Argonne National Laboratory, Sep. 10, 2003. pp. 1-23.

Wurmlin et al., "3D Video Recorder" Proceedings of the 10th Pacific Conference on Computer Graphics and Applications (PG'02) IEEE Computer Society, pp. 1-10.

Barton, "TiVO-Lution" The Challenges of delivering a reliable, wasy-to-use DVR service to the masses' ACM QUEUE, Apr. 2006, 35 more queue: www.acmqueue.com. pp. 1-8.

Chorianopoulos et al., "Affective Usability Evaluation for an Interactive Music Television Channel". AMC Computers in Entertainment, vol. 2, No. 3, Jul. 2004, Article 7b, pp. 1-11.

Eskicioglu et al. "An overview of multimedia content protection in consumer electronics devices," Signal Processing. Image Communication, Elsevier Science Publishers, Amsterdam, NL, vol. 16, No. 7, Apr. 2001, pp. 681-699, XP004232133 ISSN: 0923-5965.

International Search Report dated Sep. 7, 2003 in PCT/US03/16585.

International Search Report dated Jun. 7, 2006 in PCT/US2005/022069.

International Search Report cited in PCT/US2007/071843 mailed Nov. 27, 2007.

Supplementary European Search Report dated Jan. 8, 2008 in Application 03 755 496.01-1241.

International Search Report and Written Opinion dated Jan. 11, 2008 cited in PCT/US2007/071842.

International Search Report dated Jan. 31, 2008, in PCT/US2007/070680.

International Search Report and Written Opinion dated Mar. 10, 2008, cited in PCT/US2007/071841.

International Preliminary Report mailed Jan. 6, 2009, in PCT/US2007/072328.

European Communication mailed Feb. 9, 2009, in 078403086-1245.

European Communication mailed Feb. 10, 2009, in 07798909.3.

European Communication mailed Feb. 18, 2009, in 07798909.3 pp. 1.

European Communication mailed Apr. 29, 2009 in Application 07798908.5.

European Communication mailed Apr. 29, 2009 in Application 07 784 510.5-1247.

European Communication mailed May 11, 2009 in Application No. 05 766 482.3-1522.

European Communication mailed Feb. 11, 2009, in 07798908.5_1247.

European Communication mailed May 7, 2009 in Application 07 840 308.6 1245.

European Communication mailed Jun. 9, 2009 in Application 07 815 092.7-1245.

European Communication mailed Jul. 24, 2008 in Application 03 755 496.1-1241.

Australian Office Action mailed Aug. 4, 2009 in Application 2005258137.

Canadian Office Action mailed Aug. 19, 2009 in Application 2,571,533.

U.S. Official Action mailed Apr. 30, 2008 in U.S. Appl. No. 11/428,356.

U.S. Official Action mailed Sep. 30, 2008, in U.S. Appl. No. 11/428,362.

U.S. Official Action mailed Nov. 28, 2008 in U.S. Appl. No. 11/428,356.

U.S. Official Action mailed Dec. 12, 2008, U.S. Appl. No. 11/428,365.

U.S. Official Action mailed Mar. 18, 2009, in U.S. Appl. No. 11/428,362.

U.S. Official Action mailed Apr. 2, 2009 in U.S. Appl. No. 11/428,357.

U.S. Official Action mailed May 28, 2009, in U.S. Appl. No. 11/428,365.

U.S. Official Action mailed Jul. 22, 2009 in U.S. Appl. No. 11/428,357.

U.S. Official Action Mailed Aug. 4, 2009 in U.S. Appl. No. 11/428,356.

U.S. Official Action mailed Aug. 5, 2009 in U.S. Appl. No. 11/428,357.

U.S. Official Action mailed Aug. 7, 2009, in U.S. Appl. No. 11/428,362.
U.S. Official Action mailed Sep. 22, 2009, in U.S. Appl. No. 11/454,421.
U.S. Official Action mailed Oct. 7, 2009, in U.S. Appl. No. 11/428,367.
U.S. Official Action mailed Oct. 26, 2009, in U.S. Appl. No. 11/428,365.
U.S. Official Action mailed Oct. 28, 2009, cited in U.S. Appl. No. 11/942,778.
U.S. Official Action Mailed Dec. 9, 2009 in U.S. Appl. No. 11/428,357.
U.S. Official Action mailed Jan. 14, 2010, in U.S. Appl. No. 11/428,362.
U.S. Official Action mailed Feb. 1, 2010 in U.S. Appl. No. 11/428,356.
U.S. Official Action mailed Apr. 1, 2010 in U.S. Appl. No. 11/405,205.
Allway Sync (Allway Sync 3.2.2), Dec. 6, 2005, pp. 1-14.
Dybwad, B.; ("TiVo 7.2 OS Adds Red Flag Content Protection Feature"), Sep. 14, 2005, pp. 1-5, http://www.engadget.com/2005/09/14/tivo-7-2-os-adds-red-flag-content-protection-feature.
Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.
European Office Action mailed Mar. 16, 2009, in Application No. 07 781 952.2.
Notice of Preliminary Rejection dated May 28, 2010, cited in KR Appl. No. 10-2008-7031848, 7 pgs.
Office Action mailed Feb. 24, 2010, in U.S. Appl. No. 12/327,157.
Office Action mailed Apr. 13, 2010, in U.S. Appl. No. 11/454,421.
Office Action mailed Apr. 14, 2010, in U.S. Appl. No. 11/428,367.
Office Action mailed May 5, 2010, in U.S. Appl. No. 11/428,365.
Office Action mailed May 11, 2010, in U.S. Appl. No. 11/428,357.
Office Action mailed May 26, 2010, in U.S. Appl. No. 11/428,362.
Notice of Preliminary Rejection dated Sep. 18, 2010 cited in Korean Application No. 10-2008-7032127.
Office Action mailed Aug. 31, 2010 in U.S. Appl. No. 11/405,205.

* cited by examiner

VALIDATING CLIENT-RECEIVERS

CROSS-REFERENCE TO RELATED APPLICATION

This application is a continuation-in-part of U.S. utility application entitled, "APPARATUS FOR ENTITLING REMOTE CLIENT DEVICES," having Ser. No. 10/382,944, filed Mar. 6, 2003, now U.S. Pat. No. 7,181,010 which is a continuation-in-part of U.S. utility application entitled, "APPARATUS FOR ENTITLING REMOTE CLIENT DEVICES," having Ser. No. 10/154,495, filed May 24, 2002, now U.S. Pat. No. 6,748,080 both of which are entirely incorporated herein by reference.

FIELD OF THE DISCLOSURE

This disclosure relates generally to broadband communications systems, such as subscriber television systems, and more specifically to validating a receiver in a broadband communication system.

BACKGROUND OF THE DISCLOSURE

Frequently, broadband systems transmit television signals and programs to subscribers of a conditional access system. Broadband systems, such as cable and satellite television systems, typically include a headend for receiving programming and/or data from various sources and redistributing the programming and other data through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links among others. In a subscriber television system, the subscriber equipment, which receives the signals from the headend, can include, among others, a cable-ready television, a cable-ready video cassette recorder (VCR), or a client-receiver that is connected to a television, computer, or other display device.

The headend uses modulators to control the streams of data into the distribution system. Increasingly, the headend is receiving and transmitting programming in a digital format, for example, Moving Pictures Expert Group (MPEG) format, instead of an analog format. Transmitting programs in MPEG format is advantageous because multiple digitized programs can be combined and transmitted in, for example, 6 MHz of bandwidth, which is the same amount of bandwidth that is required to transmit a single analog channel or program, and in comparison to analog programs, MPEG or digitized programs provide a cleaner and sharper image and sound.

Content owners of programs are not particularly concerned about subscribers of a conditional access system using their VCRs to make a recording of a program because, among other things, the quality of the VCR recorded program does not match the quality of a legitimate commercial analog recording of the program, and because of difficulties associated making and distributing bootleg copies of a VCR recorded program. However, content owners are concerned about subscribers of a conditional access system recording digitized programs because, among other things, digitized programs can be transmitted and recorded virtually error-free and digitized programs can be easily copied and distributed. Thus, there exists a need for providing protection to owners of content and providing a subscriber with a digital video recorder (DVR).

DETAILED DESCRIPTION OF A PREFERRED EMBODIMENT

Embodiments of the present disclosure will be described more fully hereinafter with reference to the accompanying drawings in which like numerals represent like elements throughout the several figures, and in which an exemplary embodiment of the disclosure is shown. The present disclosure may, however, be embodied in many different forms and should not be construed as limited to the embodiments set forth herein. The examples set forth herein are non-limiting examples and are merely examples among other possible examples.

The logic of the present disclosure can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Television System Overview

The preferred embodiment of the disclosure is best understood within the context of a two-way, interactive subscriber television system (STS) or a subscriber network, as an example. An overview of an exemplary STS is provided in U.S. Pat. No. 6,157,719, entitled "Conditional Access System", which is hereby incorporated by reference in its entirety. A function of the STS is to provide interfaces to content and service providers, entitlement agents, control access to and the use of the content and services, and to distribute the content and services to subscribers. The content and services distributed to the subscribers can include programming and services such as local television channels, premium movie channels, video-on-demand (VOD), telephone services, Internet access, and audio programming, among others.

Figure 1:
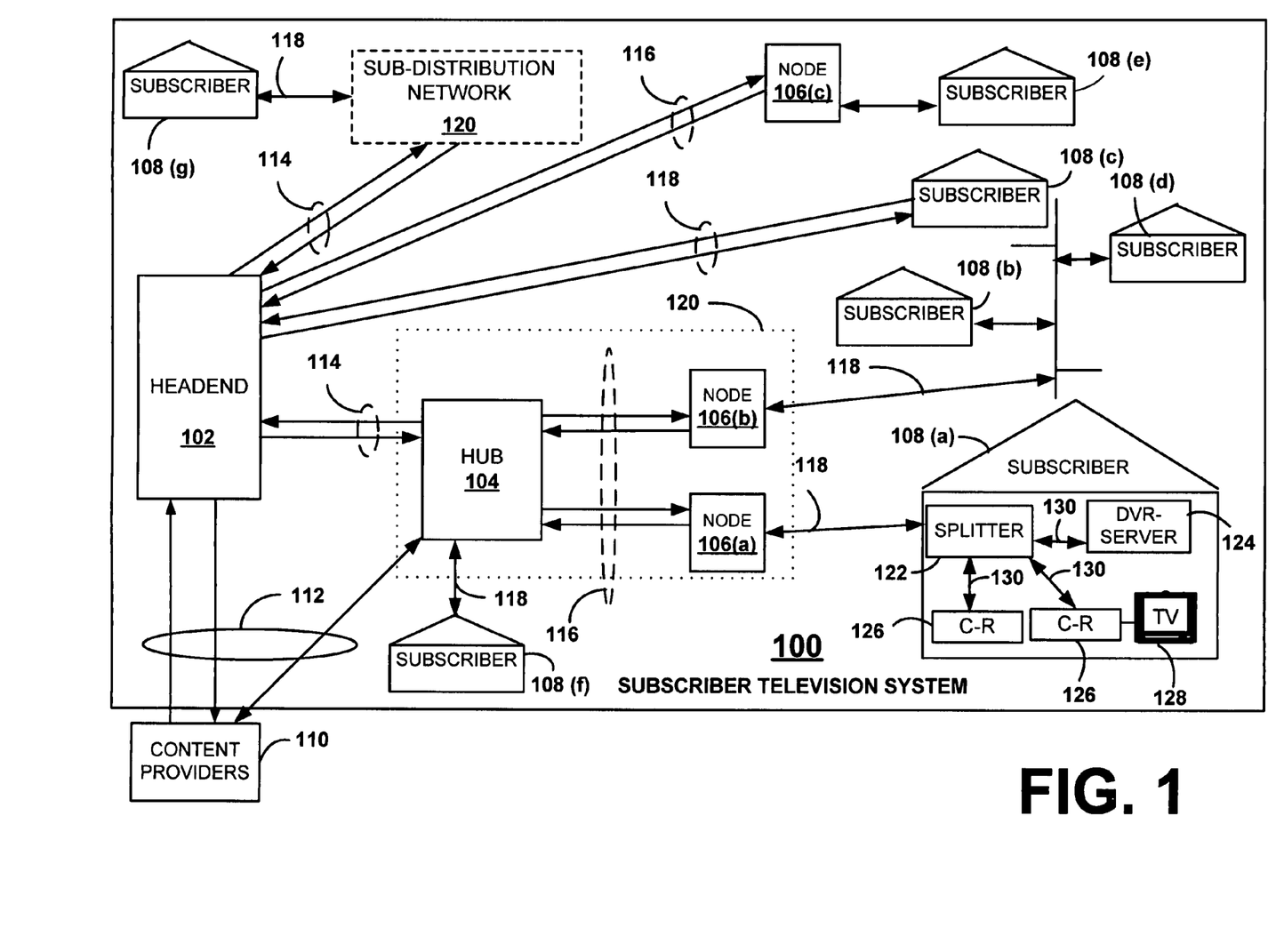
FIG. 1 is a block diagram representation of an example of a broadband communications system, such as a subscriber television system, in which the embodiments of the present disclosure may be employed.

Referring to FIG. 1, the STS 100 includes, in one example among others, a headend 102, a plurality of hubs 104, multiple nodes 106, and a plurality of subscriber locations 108. The headend 102 provides an interface between the STS 100 and content and service providers 110, such as broadcasters, internet service providers, and the like via communication link 112. The communication link 112 between the headend 102 and the content and service providers 110 can be two-way, which allows for two-way interactive services such as Internet access via STS 100, video-on-demand, interactive program guides, etc. In the preferred embodiment, the hubs 104 are also in direct two-way communication with the content and service providers 110 via communication link 112 for providing two-way interactive services.

In the preferred embodiment, the headend 102 is in direct communication with the hubs 104 via communication link 114, and the headend 102 and hubs 104 are in direct communication with selected nodes 106 via communication link 116. In addition, the headend 102 and hubs 104 are also in direct communication with selected subscriber locations 108 via communication link 118 and in indirect communication with subscriber locations 108 via nodes 106. Whether the headend 102 (or hub 104) communicates directly with nodes 106 and/or subscriber locations 108 is a matter of implementation.

In the preferred embodiment, the communication links 114 and 116 are optical fibers that allow the distribution of high quality and high-speed signals, and the communication link 118 is either broadband coaxial cable or optical fiber. In alternative embodiments, the communication links 114, 116 and 118 can incorporate one or more of a variety of media, such as optical fiber, coaxial cable, satellite, direct broadcast, or other transmission media known to those skilled in the art. Typically, the communication links 114, 116 and 118 are two-way communication media through which both in-band and out-of-band information are transmitted.

The hub 104 functions as a mini-headend for the introduction of programming and services to sub-distribution network 120. The sub-distribution network 120 includes hub 104 and the plurality of nodes 106 that are connected to hub 104. Having a plurality of hubs 104 that function as mini-headends facilitates the introduction of different programming, data and services to different sub-distribution networks 120 of STS 100. For example, the subscriber location 108(b), which is connected to node 106(b), can have different services, data and programming available than the services, data and programming available to subscriber location 108(c), which is connected directly to headend 102, even though the subscriber locations 108(b) and 108(c) may be in close physical proximity to each other. Services, data and programming for subscriber location 108(b) are routed through hub 104 and node 106(b); and hub 104 can introduce services, data and programming into the STS 100 that are not available through the headend 102.

At the subscriber locations 108, a splitter 122 receives services, data, programming, among other things, via communication link 118 and re-transmits the received content to a digital video recorder/server (DVR/S) 124, and a plurality of client-receivers 126. The splitter 122 receives in-band and out-of-band communication via communication link 118 and retransmits the in-band and out-of-band communication via a local area network (LAN) 130 to the DVR/S 124 and the client-receiver 126 and other devices, for example a computer (not shown), that are coupled to the LAN 502. The splitter 122 also receives out-of-band communication from the DCR/server 124 and the client-receivers 126 and in-band communication from the DVR/S 124. All of the communication received by the splitter 122 is transmitted at the same frequency at which it was received. To avoid conflicts, specific frequency bands are reserved for downstream communication from the headend 102 or hub 104, other frequency bands are reserved for downstream communication from components coupled to the LAN 502, and yet other frequency bands are reserved for upstream communication. The splitter 122 frequency discriminates incoming communication received via LAN 502 to determine whether to retransmit the content upstream via communication link 118 or to retransmit the content downstream via LAN 502.

Each one of the client-receivers 126 provides a two-way interface between the STS 100 and the subscriber and decodes and further process the signals for display on a display device, such as a television set (TV) 128 or a computer monitor, among other examples. Those skilled in the art will appreciate that in alternative embodiments the equipment for decoding and further processing the signal can be located in a variety of equipment, including, but not limited to, a computer, a TV, a monitor, or an MPEG decoder, among others. The client-receivers 126 are valid receivers of STS 100 and are therefore entitled to receive and access programming from the headend 102. As will be explained in detail hereinbelow, valid client-receivers have the necessary keys to decrypt encrypted programming from the headend 102 and to decrypt recorded programming from the DVR/S 124.

Among other things, the DVR/S 124 is adapted to record and playback programming from the headend 102. Some of the programming from the headend 102 may be non-restricted, meaning that it can be freely copied, and some of the programming is restricted, meaning that it cannot be freely copied. Before, the DVR/S 124 replays recorded restricted programming to a device coupled to the splitter 122, the DVR/S 124 validates that the device is a valid client-receiver 126 of the STS 100. Thus, the DVR/S 124 only provides devices that are valid client-receivers or valid components of the STS 100 with restricted content. In other words, the DVR/S 124 does not determine whether a given component is "authorized" by the operator of the STS 100 to be coupled to the STS 100 only that it is a valid component of the STS 100. Because the DVR/S 124 only provides restricted content to "validated components" of the STS 100, the headend 102 does not need to maintain a database associating specific "components" such as the client receiver 126 with the DVR/S 124. The DVR/S 124 also provides non-restricted content to devices such as computers, other storage devices, etc., that are not validated.

As will be explained in detail hereinbelow, secure communication between the headend 102, the DVR/S 124 and the client-receivers 126 is accomplished using pairs of asymmetrical keys known to those skilled in the art, such as Rivest, Shamir, & Adleman (RSA) public-key encryption technology. Briefly described, an asymmetrical key pair includes a public-key, which is distributed to the public, and a private-key, which is not distributed. Content that is encrypted with a public-key can only be decrypted using the corresponding private-key. A message that is signed with a private-key is authenticated with the corresponding public-key. Thus, after headend 102 has exchanged public-keys with the DVR/S 124 (or the client-received 126), the headend 102 and DVR/S 124 (or the client-received 126) can securely communicate. For example, the content of a message for the DVR/S 124 is encrypted using the public-key of the DVR/S 124. This means that only the DVR/S 124 can decrypt the content of the message because the DVR/S 124 is the only component that has the corresponding private-key. The message can also be signed by the private-key of the headend 102, and in that case the DVR/S 124 uses the public-key of the headend 102 to authenticate the message. For details regarding cryptography that a reasonably skilled person would understand see, Bruce Schneier, "*Applied Cryptography*", John Wiley & Sons, 1994.

Headend

Figure 2:
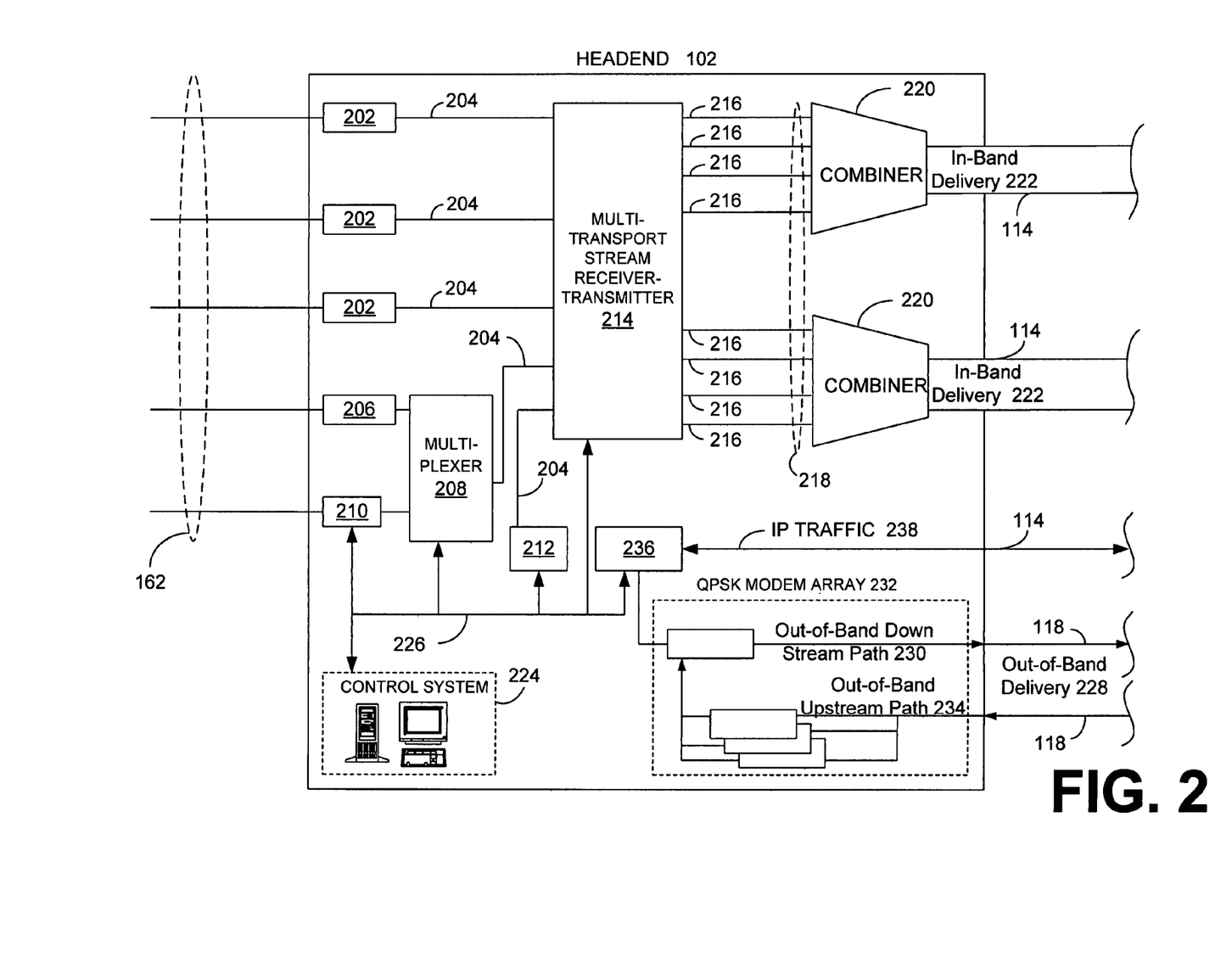
FIG. 2 is a block diagram representation of an example of a headend in the broadband communication system in which embodiments of the present disclosure may be employed.

Referring to FIG. 2, in a typical system of the preferred embodiment of the disclosure, the headend 102 receives content from a variety of input sources, which can include, but are not limited to, a direct feed source (not shown), a video camera (not shown), an application server (not shown), and other input sources (not shown). The input signals are transmitted from the content providers 110 to the headend 102 via a variety of communication links 112, which include, but are not limited to, satellites (not shown), terrestrial broadcast transmitters (not shown) and antennas (not shown), and direct lines (not shown). The signals provided by the content providers, or entitlement agents, can include a single program or a multiplex that includes several programs, and typically, a portion of the content from the input sources is encrypted.

The headend 102 generally includes a plurality of receivers 202 that are each associated with a content source. Generally, the receivers 202 transmit content in the form of a transport stream 204. MPEG encoders, such as encoder 206, are included in the headend 102 for, among other things, digitally encoding things such as local programming or a feed from a video camera, and typically, the encoder 206 produces a variable bit rate transport stream. Some of the signals may require additional processing, such as signal multiplexing prior to being modulated. Such multiplexing is done by multiplexer 208.

A switch, such as asynchronous transfer mode (ATM) switch 210, provides an interface to an application server (not shown). There can be multiple application servers providing a variety of services such as, among others, a data service, an Internet service, a network system, or a telephone system. Service and content providers 110 (shown in FIG. 1) may download content to an application server located within the STS 100 or in communication with STS 100. The application server may be located within headend 102 or elsewhere within STS 100, such as in a hub 104.

Typically, the headend 102 includes a server such as a video-on-demand (VOD) pump 212, which provides video and audio programming such as VOD pay-per-view programming to subscribers of the STS 100. The content from VOD pump 212 is provided in the form of transport stream 204.

The various inputs into the headend 102 are then combined with the other information, which is specific to the STS 100, such as local programming and control information. The headend 102 includes a multi-transport stream receiver-transmitter 214 that receives the plurality of transport streams 204 and transmits a plurality of modulated output signals 216 that carry the transport streams 204. In the preferred embodiment, the multi-transport stream receiver-transmitter 214 includes a plurality of modulators, such as, but not limited to, Quadrature Amplitude Modulation (QAM) modulators, that convert the received transport streams 204 into the modulated output signals 216 suitable for transmission over communication link 218.

The modulated output signals 216 are combined, using equipment such as a combiner 220, for input into the communication link 114, and the combined signals are sent via the in-band delivery path 222 to subscriber locations 108. It is to be understood that the modulation of the output transport streams 204 is a matter of implementation based at least in part on the communication link 218 that carries the modulated output signals 216.

In the STS 100, video, audio, and control information are encoded as program streams, which are then multiplexed to form transport streams 204. Each one of the modulated output signals 216 is modulated to a set frequency. For the client-receiver 126 (shown in FIG. 1) to receive a television program, in the preferred embodiment, among others, the client-receiver 126 tunes to the frequency associated with the modulated signal 216 that carries the transport stream 204 that contains the desired information, de-multiplexes the desired transport stream, and decodes the appropriate program streams.

A system controller, such as control system 224, which preferably includes computer hardware and software providing the functions discussed herein, allows the STS system operator to control and monitor the functions and performance of the STS 100. The control system 224 interfaces with various components, via communication link 226, in order to monitor and/or control a variety of functions, including the channel lineup of the programming for the STS 100, billing for each subscriber, and conditional access for the content distributed to subscribers. Control system 224 provides input to the multi-transport stream receiver-transmitter 214 for setting its operating parameters, such as system specific MPEG table packet organization or conditional access information.

Control information and other data can be communicated to client-receivers 126 via the in-band delivery path 222 or to client-receivers 126 connected to the headend 102 via an out-of-band delivery path 228. The out-of-band data is transmitted via the out-of-band downstream path 230 of communication link 118 by means such as, but not limited to, a Quadrature Phase-Shift Keying (QPSK) modem array 232, an array of data-over-cable service interface specification (DOCSIS) modems, or other means known to those skilled in the art. Two-way communication utilizes the upstream portion 234 of the out-of-band delivery system. Client-receivers 126 transmit out-of-band data through the communication link 118, and the out-of-band data is received in headend 102 via out-of-band upstream paths 234. The out-of-band data is routed through a router 236 to an application server or to the VOD pump 212 or to control system 224. Out-of-band control information includes such information as a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 232 is also coupled to communication link 116 (FIG. 1) for two-way communication with the client-receivers 126 coupled to nodes 106.

The router 236 is used for communicating with the hub 104 through communication link 114. Typically, command and control information among other information between the headend 102 and the hub 104 are communicated through communication link 114 using a protocol such as but not limited to Internet Protocol. The IP traffic 238 between the headend 102 and hub 104 can include information to and from client-receivers 126 connected to hub 104.

The control system 224, such as Scientific-Atlanta's Digital Network Control System (DNCS), as one acceptable example among others, also monitors, controls, and coordinates all communications in the subscriber television system, including video, audio, and data. The control system 224 can be located at headend 102 or remotely.

The STS 100 employs a three tiered encryption scheme. In the first tier, which is the most secure, secure-messages such as Entitlement Management Messages (EMMs) are used to communicate, among other things, "entitlements" and "keys" from the control system 224 to the valid components of the STS 100 such as the DVR/S's 124 and client-receivers 126. In one preferred embodiment, the EMMs are transmitted via the down stream out-of-band path 230. However, the EMMs can also be transmitted via the in-band delivery path 222. The "keys" that are provided to the valid components of the STS 100 include multi-session keys (MSKs), which are also sent to the multi-transport stream-transmitter 214. MSKs are keys that are changed on a predetermined basis such as daily, weekly, or monthly and that, among other things, are employed in the encryption and decryption of programs/services.

In the second tier, the multi-transport stream transmitter 214 transmits Entitlement Control Messages (ECMs) in the in-band delivery path 222. Each ECM includes a control word reference and an entitlement-identifier and is associated with one of the encrypted services provided by the STS 100. Only devices that have the appropriate "keys" and "entitlements" from the control system 224 are able to generate a control word using the control word reference.

In the third tier, both encrypted programs and non-encrypted programs are transmitted from the multi-transport stream-transmitter 214 via the in-band delivery path 222 to the DVR/S's 124 and the client-receiver 126. The multi-transport stream-transmitter 214 encrypts selected programs using a "control word" as a key to a symmetrical encryption function. The control word is changed frequently, on the order of several times per minute, so that the loss of a single control word does not jeopardize the security of the STS 100. Typically, the content is encrypted using a symmetric cryptographic algorithm such as the Data Encryption Standard (DES) or triple DES (3DES), Digital Video Broadcasting (DVB) Common Scrambling or other cryptographic algorithms or techniques known to those skilled in the art. The multi-transport stream receiver-transmitter 214 receives instructions from the control system 224 regarding the processing of programs included in the input transport streams 204. Sometimes the input transport streams 204 include programs that are not transmitted downstream, and in that case the control system 224 instructs the multi-transport stream receiver-transmitter 204 to filter out those programs. The control system 224 determines program processing information such as which of the input services/programs carried by the input transport streams 204 are to be filtered-out (dropped), encrypted, or processed without encryption. The control system 224 provides the multi-transport stream receiver-transmitter 214 with the programming processing information, and based upon the programming processing information, the multi-transport stream receiver-transmitter 214 filters selected input programs, encrypts selected input programs, and transmits both encrypted programs and selected input programs that were not encrypted in the output transport stream 216.

Based upon the instructions received from the control system 224, the multi-transport stream receiver-transmitter 214 encrypts some or all of the programs included in the input transport streams 204 and then includes the encrypted programs in the output transport streams 216. Some of the programs included in input transport stream 204 do not need to be encrypted, and in that case the control system 224 instructs the multi-transport stream transmitter-receiver 214 to transmit those programs without encryption.

In one preferred embodiment, the multi-transport stream transmitter 214 includes a random number generator (not shown), and the output of the random number generator is a control word that is used to encrypt a portion of a selected program. Each time the random number generator produces a new control word, the multi-transport stream transmitter 214 encrypts the control word using an MSK as a key to a symmetric encryption function to produce a control word reference, which is then transmitted to the DVR/S's 124 and client-receivers 126 in ECMs.

In another preferred embodiment, the multi-transport stream transmitter 214 includes a counter (not shown), and the output of the counter is a control word reference. Each time the counter produces a new control word reference, the multi-transport stream transmitter 214 transmits the control word reference to the DVR/S's 124 and client-receivers 126 in ECMs. The multi-transport stream transmitter 214 encrypts the control word reference with an MSK to generate a control word, which is then used to encrypt a portion of a selected program.

When a subscriber of the STS 100 wants to access an encrypted service, the client-receiver 126 of the subscriber accesses the ECMs that are associated with the encrypted service to determine the entitlement-identifier and uses the entitlement-identifier to determine whether or not the client-receiver 126 is entitled to the service. If the client-receiver 126 is entitled, the client-receiver 126 then uses the MSK to process the control word reference into a control word. Depending upon the embodiment, the control word reference is either encrypted or decrypted to generate a control word at the client-receiver 126 or at the DVR/S 124. The control word is then used to decrypt a specific portion of the encrypted service. The client-receiver 126 receives ECMs carrying new control word references several times a minute and generates a new control word for each new control word reference so that subsequent portions of the encrypted service can be decrypted.

Figure 3A:
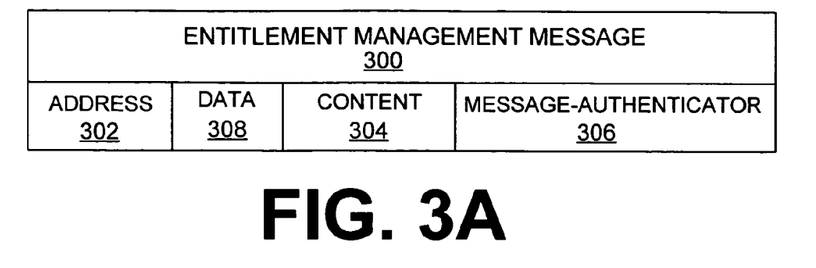
FIG. 3A is a block diagram of an entitlement management message.
Figure 3B:
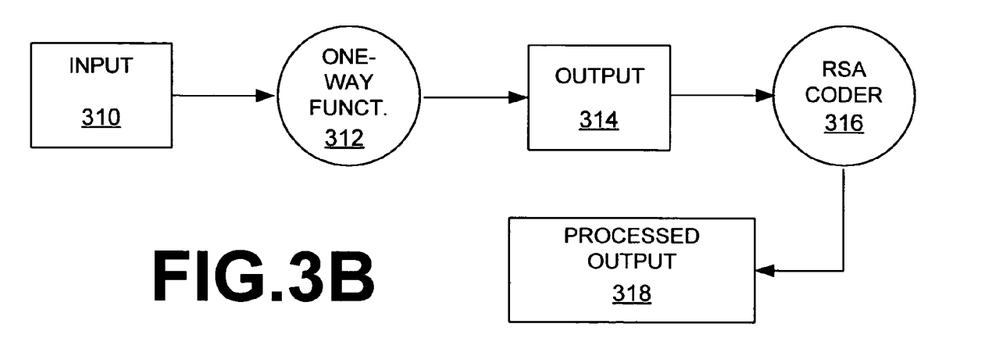
FIG. 3B is a block diagram of a process for making a message-authenticator.
Figure 4A:
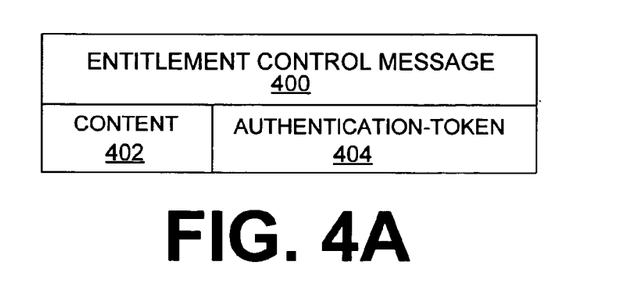
FIG. 4A is a block diagram of an entitlement control message.
Figure 4B:
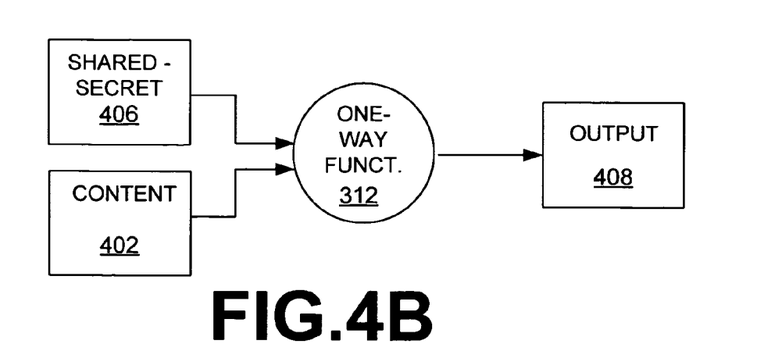
FIG. 4B is a block diagram of a process for making an authentication-token.

Before describing the subscriber location 108, a description of secure-messages such as EMMs and a description of ECMs is provided and illustrated in FIG. 3 and FIG. 4, respectively. Illustrated in FIG. 3A is an EMM 300, which is an exemplary secure-message, having an address field 302, message-content 304 and a message-authenticator 306.

The address field 302 includes the address of the recipient. For example, the address field 302 of an EMM from the headend 102 to a particular client-receiver 126 includes the IP address or serial number of the particular client-receiver 126. In an alternative embodiment, the address field 302 is a unique identifier, which is unique to the particular client-receiver 126 in the STS 100.

The message-content 304 includes the substance of the message, the information that the sender intends the recipient to receive. Depending upon the information included therein, the message-content 304 can be encrypted or not encrypted. Whether the message-content 304 is encrypted depends upon whether or not privacy is desired. If the message-content 304 includes a public-key of a private-key/public-key pair, then the public-key is probably not encrypted because public-keys are intended to be distributed. However, if the message-content 304 includes secret information, which is not to be distributed to the public, such as, but not limited to, MSKs or entitlements, then the content is normally encrypted. Whether the message-content 304 is encrypted is a matter of implementation and depends in part upon the sought after level of security in the STS 100.

A data field 308 includes data for processing the EMM 300. The data field 308 includes key-identifiers that are used for identifying the keys used in encrypting and signing portions of the EMM 300. For example, when the content 304 is encrypted by the public-key of the recipient, the data field 308 indicates that the content 304 is encrypted and which public-key was used for the encryption.

The message-authenticator 306 is used for, among other things, authenticating the message-content 304, i.e., checking that the received message-content is the same as the message-content that was intended to be sent. In other words, among other things, the recipient of the EMM 300 uses the message-authenticator 306 to make certain that the message-content 304 was not tampered with nor garbled during transmission. Typically, the message-authenticator 306 is processed by a private-key belonging to the sender so that the recipient of the EMM 300 can use the processed message-authenticator 306 to authenticate that the purported sender of the EMM is the actual sender.

In FIG. 3B, which illustrates an exemplary procedure for the creation of the message-authenticator 306, circles denote processes or functions and rectangles denote objects or output. A one-way function 312, such as an MD 5 hash function, receives an input 310 and produces an output or digest 314. For the purposes of this disclosure, a one-way function is a cryptographic operation where an input is run through some mathematical operations to produce an output or digest, which is probably of fixed-length and which is probably unique. The digest has at least two properties: (1) determining the input to the one-way function, given the digest, is virtually impossible or is at least computationally difficult; and (2) the digest for an input is essentially unique, i.e., the probability that two different inputs will result in the same output is extremely small. Generally, the digests discussed in this disclosure are generated from one-way functions.

The input 310 includes the unencrypted message-content 304 or at least a portion thereof. The digest 314 is a value that is dependent upon the input 310. If the input 310 is changed, the value of the digest 314 also changes.

Normally, the digest 314 is digitally signed or processed by a digital signature function 316 using a cryptographic technique such as RSA, to produce a processed digest 318. On the other hand, if the digest 314 is not digitally processed, then the digest 314 is included in the EMM 300 as the message-authenticator 306. Digitally signing the digest 314 converts the value of the digest 314 from its original value to a different value. The value of the processed digest 318 is changed back to the original value of the digest 314 by reprocessing the processed digest 318 with the correct key. In one preferred embodiment, the digital signature function applies a private-key to the digest 314 to generate the processed digest 318, and the corresponding public-key is used on the processed digest 318 by the recipient of the EMM 300 to regenerate the digest 314. In one preferred embodiment, the control system 224 includes the logic for making signed digests 318, which are then used as processed message-authenticators 306.

An ECM 400, which is illustrated in FIG. 4A, includes a message-content 402 and an authentication-token 404. The message-content 402 includes a control word reference (not shown) and an entitlement-identifier (not shown). The authentication-token 404 is used by the recipient of the ECM 400 to determine that the ECM 400 is an authentic ECM, which was neither tampered with nor corrupted in transmission.

In FIG. 4B, which illustrates an exemplary procedure for the creation of an authentication-token, circles denote processes or functions and rectangles denote objects such as inputs and outputs. At least a portion of a shared-secret 406, which is information that is commonly known by both the sender of the ECM and valid components of the STS 100, and at least a portion of the ECM message-content 402 are input into the one-way function 312 to produce an output digest 408. The output digest 408 is included in the ECM 400 as the authentication-token 404. The shared-secret 406 is transmitted from the headend 102 to valid components of the STS 100 such as the DVR/S 124 and the client-receivers 126 in EMMs 300, prior to transmitting an ECM 400.

Typically, the shared-secret 406 is included in an EMM 300 that is addressed to a specific recipient and is encrypted using the public-key of that recipient so that the shared-secret cannot be readily determined by unauthorized users. So long as the shared-secret is kept confidential between the headend 102 and valid components of the STS 100, the content 402 of an ECM 400 cannot be tampered with.

Subscriber Location 108

Figure 5:
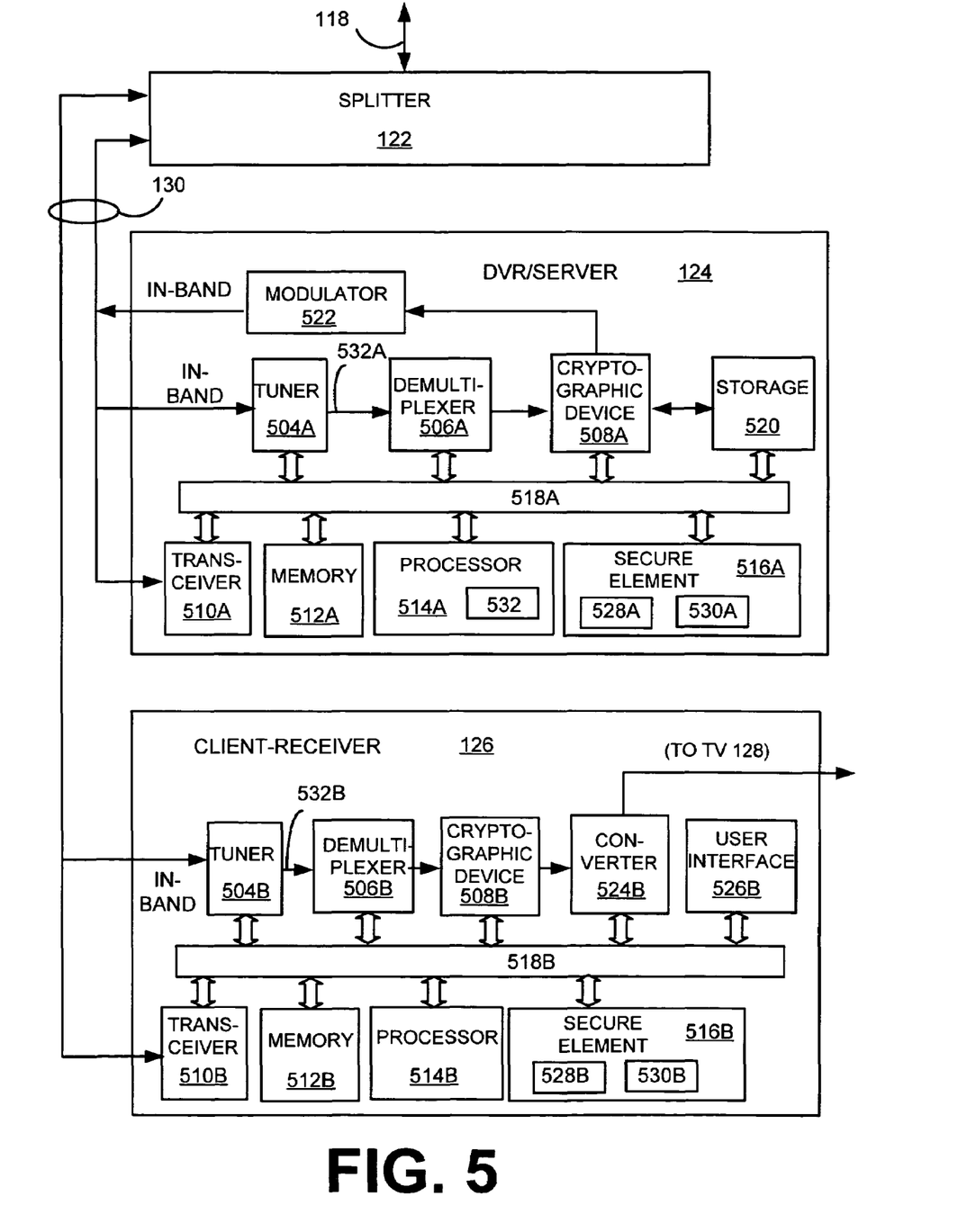
FIG. 5 is a block diagram of components located at a subscriber's location.

Refer to FIG. 5, at the subscriber location 108, the splitter 122 receives both in-band and out-of-band downstream communication via communication link 118 and transmits the downstream communication to the DVR/S 124 and the client-receiver 126 via the LAN 130. The DVR/S 124 and client-receiver 126 each include a tuner 504, a demultiplexer 506, a cryptographic device 508, a transceiver 510, a memory 512, a processor 514, a secure-element 516, and a bus 518. The DVR/S 124 also includes a storage device 520 and a modulator 522, and the client-receiver 126 also includes a converter 524 and a user-interface 526.

Typically, each valid component of the STS 100 includes a secure-element 516, which includes a processor 528 and a memory 530. The memory 530 is accessible only to the processor 528 and, among other things, has keys and secrets stored therein. For example, the memory 530B, which is included in the secure-element 516B of the client-receiver 126, includes the private-key of the private-key/public-key pair belonging to the client-receiver 126. Typically, the private-key/public-key pair is provided to the secure-element 516 in a secure fashion by the manufacturer of the component having the secure-element 516. The memory 530 also includes shared-secrets and entitlements granted by the operator of the STS 100 or by an entitlement agent for programming and services provided by the STS 100. The entitlements and shared-secrets are normally transmitted from the headend 102 (or hub 104) to components such as the client-receiver 126 and DVR/S 124 using secure communications such as EMMs 300. Among other things, the processor 528 authenticates an EMM and stores the content of the EMM only if the EMM is authentic, i.e., the EMM came from the headend 102 (or hub 104) and has not been tampered with nor corrupted. Before describing how the DVR/S 124 determines whether the client-receiver 126 is a valid component of the STS 100 having access to restricted content, a brief description of the components of the DVR/S 124 and client-receiver 126 is provided.

Typically, the user-interface 526 is a conventional touch key pad and/or an infra-red detector for receiving signals from a remote control (not shown), or similar device, through which the user enters commands, such as selecting a "user-channel" for viewing a selected service instance. It is important to remember that a "user-channel" is not a conventional television channel. A conventional television channel in a cable television system is a 6 MHz band (which carries one analog program) centered on a particular frequency. However, today a "user-channel" conceptually corresponds to an instance of a program or a string of program instances. Frequently, multiple program instances are multiplexed together in a transport stream, and the transport stream is RF modulated and transmitted in a 6 MHz band. Thus, a single 6 MHz band carries multiple service instances or user-channels. When a user changes programs or service instances by selecting a new user-channel, the new user-channel and the old user-channel might be carried in the same 6 MHz band or in different 6 MHz bands. So it is important to distinguish between a conventional channel and a user-channel. It is to be understood user-channel represents one type of communication channel. Communication channels include, but are not limited to, communication signals that are separated by: frequency, which is generally referred to as frequency-division multiplexing (FDM); time, which is generally referred to as time-division multiplexing (TDM); and code, which is generally referred to as code-division multiplexing (CDM).

In addition, to selecting user-channels, the user can use the user-interface 526 to program the DVR/S 124 to record programs and to play back recorded programs. A menu of options is shown to the user on the screen of the television 128, and the user uses the remote control (not shown) or the key pad to select options from the menu. When the user is programming the DVR/S 124 or accessing recorded programs on the DVR/S 124, the user selected options are provided to the DVR/S 124 via the LAN 502. Among other things, the processor 514A and memory 512A of the DVR/S 124 include the necessary logic for providing the menu of options to the user, for recording pre-selected programming according to the input of the user, and for determining whether the client-receiver 126 is permitted to access restricted recorded programming.

The transceivers 510A and 510B are adapted to receive out-of-band communication and transmit out-of-band communication over a range of frequencies. The received out-of-band communication includes, among other things, system tables and messages including secure messages such as EMMs 300. EMMs 300 are sent to the secure-element 516 for processing and the system tables are stored in memory 512A and 512B. Messages transmitted from the transceiver 510A or 510B for components coupled to the LAN 502 are transmitted to the splitter 122 at particular frequencies reserved for downstream rebroadcast over the LAN 502. Messages that are intended for the headend 102 are transmitted to the splitter 122 at frequencies that do not overlap with the reserved downstream rebroadcast frequencies.

Typically, the system tables stored in memory 512A or 512B include tables of system information such as program number tables and encryption tables, which identify, among other things, whether a program is encrypted or not. Typically, MPEG tables such as network identification tables (NITs), conditional access tables (CATs), program map tables (PMTs) are also stored in the memory 512A and 512B.

The processor 514B uses the system information tables and the MPEG tables such as the network information tables (NITs) stored in memory 512B to determine the frequency band associated with the user selected "channel." The processor 514B then instructs the tuner 504B to tune to that particular frequency band. The instructions are relayed from the processor 514B to the tuner 504 via bus 518B.

The tuner 504B provides the demultiplexer 506B with the transport stream 532B that is contained in the frequency band to which the tuner 504B is tuned. The demultiplexer 506B extracts system MPEG tables such as NITs, PATs and CATs, which are included in MPEG packets having reserved program identifiers (PID) values, and provides the tables to the processor 514B via bus 518B. Typically, the system MPEG tables are periodically included in the transport stream 532B, and when a new system MPEG tables is extracted by the demultiplexer 506B, the new table is sent to the processor 514B, which may then store the new table in memory 512B for quick access in the future. In an alternative embodiment, system MPEG tables are not stored in the memory 512B but instead are provided to the processor 514B by the demultiplexer 506B as needed.

The processor 514B uses the system MPEG tables to determine a program map table (PMT) for the user-channel selected by the user. The PMT includes the PID values of the various MPEG packet streams that make up the program carried in the selected user-channel. The processor 514B provides the demultiplexer 506B with the PID values for the program, and the demultiplexer 506B extracts MPEG packets having those PID values from the transport stream 532B and provides those packets to the cryptographic device 508B. In addition to extracting system tables and specific packets, the demultiplexer 506B extracts ECMs 400 that are associated with the program carried in the user-channel. The ECMs 400 are then provided to the secure processor 516B, via bus 518B, for processing.

The processor 528B of the secure-element 516B determines whether the ECM 400 associated with the program is authentic and whether the client-receiver 126 is entitled to access the program. The processor 528B uses the entitlement-identifier in the ECM 400 to check the entitlements stored in the memory 530B. Only if the ECM 400 is authentic and the client-receiver 126 has the necessary entitlement does the processor 528B generate the control word for decrypting the program using the control word reference of the ECM 400. The processor 528B determines whether the ECM 400 is authentic by inputting at least a portion of the message-content 402 of the ECM 400 and at least a portion of a shared-secret into a one-way function to generate a local authentication-token. If the local authentication-token matches the authentication-token 404 included in the ECM 400, then the processor 528B provides the cryptographic device 508B with the control word.

The cryptographic device 508B decrypts encrypted MPEG packets and provides the decrypted MPEG packets to the converter 524 so that they can be converted to the appropriate format for a user device such as, but not limited to, a TV 112, VCR, or computer. In the event that the program selected by the user is not encrypted, the cryptographic device 508B simply passes the packets through to the converter 524. Alternatively, the processor 514B can determine that the program is not encrypted, and in that case, instruct the demultiplexer 506B to send the MPEG packets directly to the converter 524.

The tuner 504A, demultiplexer 506A, transceiver 510A, memory 512A, processor 514A, and secure-element 516A of the DVR/S 124 function substantially the same as like numbered components of the client-receiver 126 and will not be described again. Responsive to the user programming the DVR/S 124 to record a program, the processor 514A provides instructions to the tuner 504A and demultiplexer 506A such that the MPEG packets that make up the program are extracted from the transport stream 532A and provided to the cryptographic device 508A. In one preferred embodiment, the cryptographic device 508A is adapted to both decrypt content received from the demultiplexer 506A and then re-encrypt the content before storing the content on the storage device 520. Typically, the content is re-encrypted using a symmetric encryption/decryption key, and the encryption/decryption key or an encryption/decryption key indicator is stored in the storage device 520 along with the re-encrypted content. Alternatively, in another preferred embodiment, the cryptographic device 508A can also pass content that makes up a program for recording and the ECMs 400 that are associated with the program to the storage device 520 for storage. In this alternative embodiment, when the DVR/S 124 replays the content stored in the storage device 520, the ECMs associated with the program are provided to the secure-element 516A, which then provides the cryptographic device 508A with the control words to decrypt the content. The cryptographic device 508A then re-encrypts the content, preferably, using a symmetric encryption/decryption key. In either embodiment, the encryption/decryption key or an encryption/decryption key indicator is provided to the client-receiver 126. The encryption/decryption key indicator is information from which the client-receiver 126 can produce the encryption/decryption key. Non-limiting examples of the encryption/decryption key indicator include a counter value which when encrypted using a shared-secret produces the encryption/decryption key, or a reference to a shared-secret which is the encryption/decryption key, or the encryption/decryption key indicator could be the encryption/decryption key after it has been encrypted using the public-key belonging to the client-receiver 126. It should be emphasized that the secure-element 516A must have the necessary entitlement to access the encrypted program and that the DVR/S 124 will only provide the recorded program and the encryption/decryption key indicator (or the encryption/decryption key) to the client-receiver 126 after the client-receiver 126 has been validated. It should also be noted that in an alternative embodiment, asymmetric keys can be used to re-encrypt and decrypt re-encrypted content.

In yet another preferred embodiment, the cryptographic device 508A passes both ECMs and encrypted MPEG packets to the storage device 520 without decrypting the MPEG packets. When the DVR/S 124 replays the recorded program, the ECMs and the encrypted MPEG packets are provided to the client-receiver 126, which then processes them to decrypt the program. Again, the DVR/S 124 will only provide the recorded program to the client-receiver 126 if the client-receiver 126 is validated, and the client-receiver 126 can only decrypt the program if it is entitled to access the program.

The modulator 522 receives the MPEG packets associated with the program from the cryptographic device 508A and transmits the program at a specific in-band frequency to the splitter 122. In the preferred embodiment, the modulator 522 employs a Quadrature Amplitude Modulation (QAM) scheme.

Figure 6A:
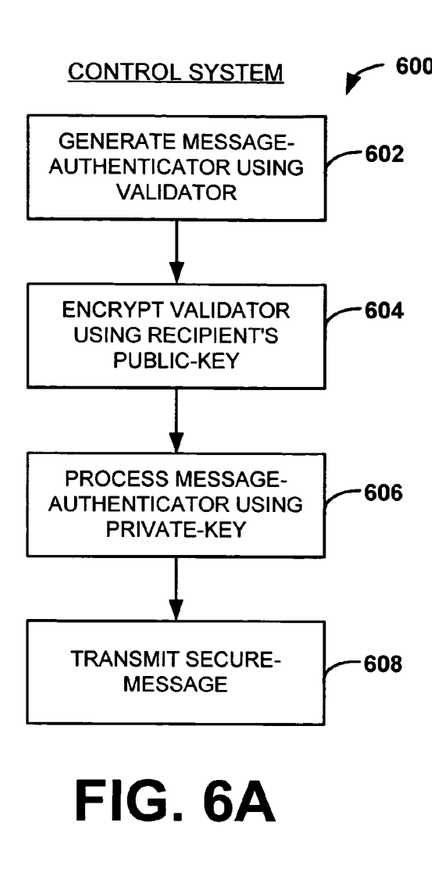
FIG. 6A is a flowchart representation of steps performed by the headend to provide selected components of the subscriber television system with a validator.
Figure 6B:
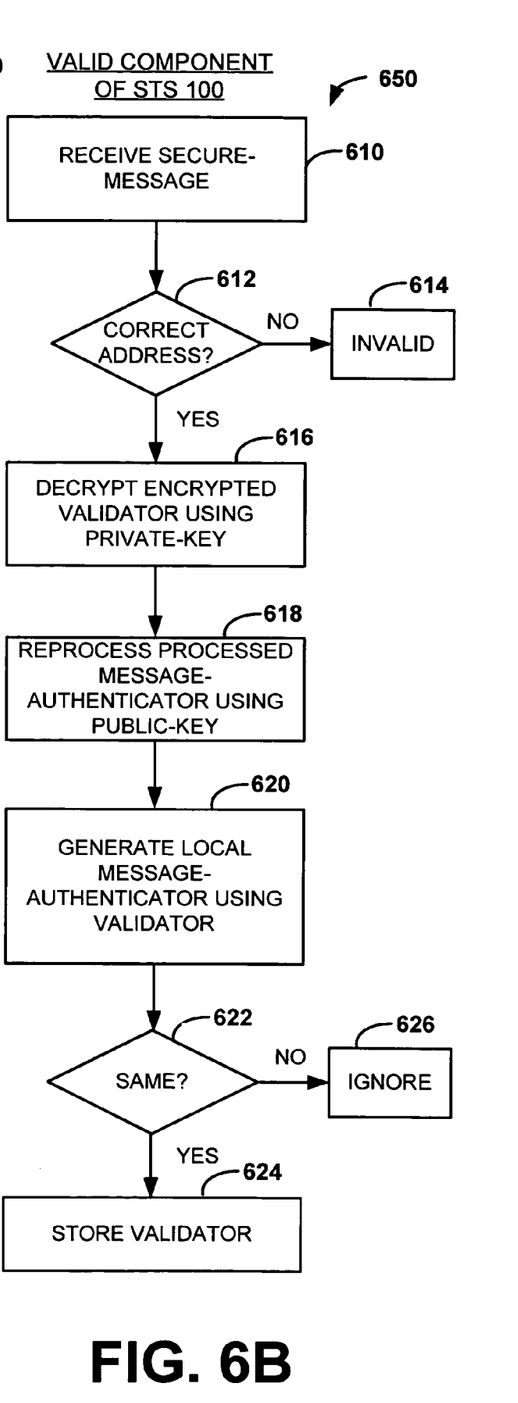
FIG. 6B is a flowchart representation of steps performed by the selected components of the subscriber television system responsive to receiving a message having validator.
Figure 7A:
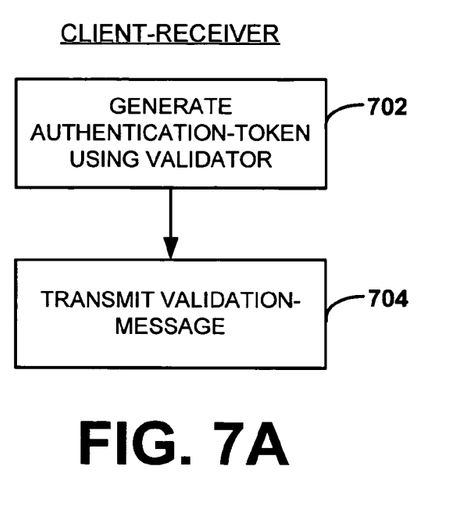
FIG. 7A is a flowchart representation of steps performed by a component of the subscriber television system having a validator to generate a validation-message.
Figure 7B:
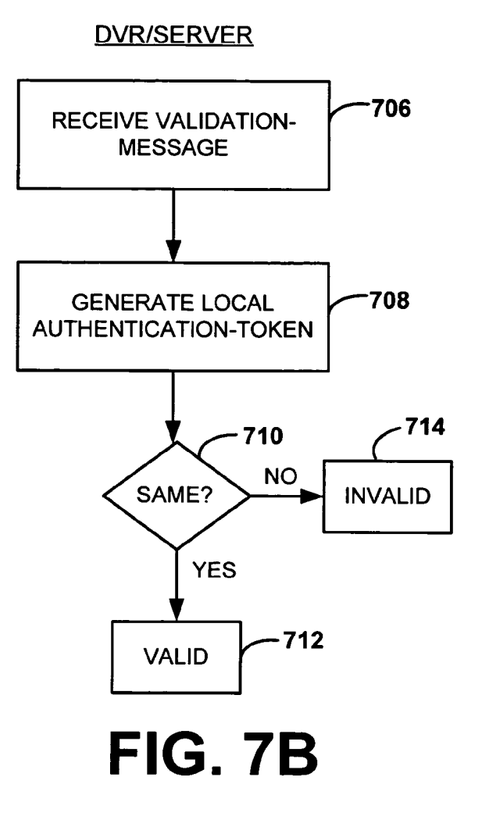
FIG. 7B is a flowchart representation of steps performed by a DVR/Server responsive to receiving a validation-message.

Exemplary steps illustrating the validation procedure are illustrated in FIGS. 6 and 7. The validation process starts at the control system 224 because it has the ability to securely communicate with components of the STS 100 using EMMs 300. Steps 600, which are shown in FIG. 6A, illustrate the steps taken by the control system 224 and steps 650, which are shown in FIG. 6B, illustrate the steps taken by the DVR/S 124 and the client-receiver 126. In step 602, the control system 224 generates a message-authenticator using at least a portion of a validator as an input to a one-way function. Non-limiting examples of the validator include, but are not limited to, operational parameters, system information, symmetric keys and asymmetric keys. The validator is securely transmitted from the control system 224 to the selected downstream components in secure messages such as EMMs 300.

In step 604, the validator is encrypted using a public-key. The control system 224 uses the public-key belonging to a specific downstream component, and addresses the secure message to that specific downstream component. In step 606, the control system 224 processes the message-authenticator using the private-key belonging to the control system 224, and in step 608, the processed message-authenticator and the encrypted validator are transmitted to the specific downstream component in a secure message.

Refer to FIG. 6B, in step 610, a downstream component, which is a valid component of the STS 100, receives the secure message, and in step 612, the downstream component determines whether the secure message was addressed thereto. If the secure message was not addressed to the downstream component, then in step 614 the downstream component ignores the secure message. On the other hand, if the secure message was addressed to the downstream component, then in step 616, the secure-element 516 of the downstream component decrypts the encrypted validator using the private-key belonging to the downstream component.

In step 618, the secure-element 516 of the downstream component reprocesses the processed message-authenticator using the public-key of the control system 224. Next, in step 620, the secure-element 516 generates a local message-authenticator by inputting at least a portion of the validator into a one-way function. In step 622, the secure-element 516 compares the two message-authenticators and determines whether they are the same, and if so, in step 624 stores the validator in the memory 530 of the secure-element 516 of the downstream component. On the other hand, if the two message-authenticators are different, then in step 626 the secure-element 516 of the downstream component ignores the validator.

It should be noted that in one preferred embodiment, the client receivers 126 are validated with the DVR/S 124 without any upstream communication with the headend 102. In this embodiment, the manufacturer of the DVR/S 124 and the client receivers 126 first provide the operator of the STS 100 with the public-keys of the DVR/S 124 and client receivers 126, and then the control system 224 provides the DVR/S 124 and client receivers 126 with the validator in secure message.

Furthermore, in another alternative embodiment, the validator is transmitted from the headend 102 to valid components of the STS 100 such as the client receivers 126 without being encrypted. In that case, the control system 224 implements 602, 606, and 608, and the valid components of the STS 100 implement the steps 610-626 except for step 616.

In yet another embodiment, a validator is made up of multiple pieces of information or portions of multiple pieces of information, and some of the pieces of information, which include, but are not limited to, symmetric and/or asymmetric keys and secrets, are transmitted from the control system 224 to valid components in the STS 100. The control system 224 can send instructions to the valid components of the STS 100 that other information, which is already known to the valid components such as operation parameters are to be included in a validator. For the purposes of this disclosure a validator is one or more pieces of information known to valid components of the STS 100.

FIGS. 7A and 7B illustrate exemplary steps taken by the client receiver 126 and the DVR/S 124, respectively, to validate the client receiver 126 with the DVR/S 124, i.e., to convince the DVR/S 124 that the client receiver 126 is a valid component of the STS 100 that can, among other things, receive restricted content from the DVR/S 124. In step 702, the secure-element 516B of the client receiver 126 generates an authentication-token using at least a portion of the validator, which is also known to the DVR/S 124.

Figure 8:
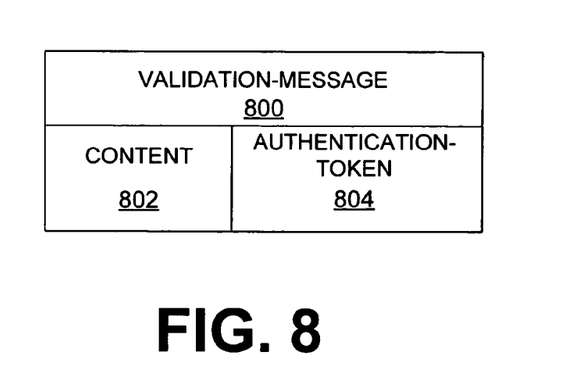
FIG. 8 is a block diagram representation of a validation-message.

In step 704, the client receiver 126 transmits a validation-message 800, which is illustrated in FIG. 8, to the DVR/S 124. The validation-message 800 includes a message-content 802 and an authentication-token 804, which was generated by the client receiver 126. The message-content 802 includes, among other things, a client-identifier (not shown) which uniquely identifies the client receiver 126. In one preferred embodiment, the message-content 802 also includes a second authentication-token (not shown), which is the output of a one-way function having at least a portion of the client identifier as an input. Non-limiting examples of client-identifiers, include, but are not limited to, the public-key of the client receiver 126 and the IP address of the client receiver 126.

Refer to FIG. 7B, in step 706, the DVR/S 124 receives the validation-message 800, and in step 708, processor 528A of the secure-element 516A of the DVR/S 124 extracts the validator from the memory 530A and generates a local authentication-token using at least a portion of the validator. In step 710, the secure-element 516A of the DVR/S 124 compares the local authentication-token and the authentication-token 804 of the validation-message 800 and determines whether they are the same. If the local authentication-token and the authentication-token 804 of the validation-message 800 are the same, then in step 712, the secure-element 516A of the DVR/S 124 determines the client receiver 126, is a valid component of the STS 100. Typically, the client-identifier included in the validation-message 800 is the public-key of the client-receiver 126. After, the secure-element 516A has validated the client-receiver 126, the public-key of the client-receiver 126 is stored in memory 512A or memory 530A. Once, the DVR/S 124 has the public-key of the client-receiver 126, the DVR/S 124 can use the public-key of the client-receiver 126 to encrypt the content of messages for the client-receiver 126. For example, the DVR/S 124 can encrypt the encryption/decryption key for a requested recorded program so that only the client-receiver 126 can decrypt the encrypted encryption/decryption key and access the recorded program.

Referring back to step 710, the secure-element 516A of the DVR/S 124 determines the client receiver 126 is not a valid component of the STS 100 if the local authentication-token and the authentication-token 804 are different.

In one preferred embodiment, the client receiver 126 generates a message-authenticator using at least a portion of the client-identifier for the client receiver 126 as an input to a one-way function, the output of which is the message-authenticator. The message-authenticator is then included along with the client identifier in the message-content 802. Typically, at least a portion of the message-content 802 and at least a portion of the validator are input into a one-way function the output of which is the authentication-token 804.

When the DVR/S 124 receives the validation-message 800, the processor 514B generates a local message-authenticator using the message-content 802. Typically, the software that is necessary for generating a local message-authenticator is stored in memory 512B. If the local message-authenticator is not the same as the message-authenticator included in the message-content 802, then the secure-element 516A does not validate the purported sender of the validation-message 800.

The message-authenticator prevents an unauthorized user from attempting to modify the message-content 802 such as, for example, changing the client-identifier and provides the DVR/S 124 with a way of determining that the message-content 802 was not corrupted in transmission. If the message-content 802 were corrupted or altered, then the local message-authenticator would not be the same as the message-authenticator included in the validation-message 800. Even if an unauthorized user made a new message-authenticator to correspond to the altered message-content 802, then the authentication-token 804 would not match because the authentication-token 804 is the output of a one-way function having the original message content as the input. The unauthorized user cannot make the appropriate authentication-token without knowing the validator from the control system 224.

In one preferred embodiment, after the DVR/S 124 has determined that the client receiver 126 is a valid component of the STS 100, the DVR/S 124 sends a confirmation message to the client receiver 126. If the client receiver 126 does not receive a confirmation message within a predetermined amount of time after transmitting the validation-message 800, then the client receiver 126 sends another validation-message 800 to the DVR/S 124. The client receiver 126 will continue to send a validation-message 800 until it receives a confirmation message. Thus, eventually an uncorrupted validation-message 800 will be received by the DVR/S 124.

It should be emphasized that the above-described embodiments and examples of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. In a subscriber television system having a headend, a server, which is remote from the headend, and a plurality of client-receivers for receiving programming from the headend and the server,
   a validation-message generated by a given client-receiver of the plurality of client-receivers and embodied in a computer readable medium for validating the given client-receiver with the server, the validation-message comprising:
   a client-identifier associated with the given client-receiver; and
   an authentication-token, wherein the authentication-token is produced by providing an input to a one-way function, wherein the input to the one-way function includes at least a portion of a validator and at least a portion of the client-identifier, wherein the validator is transmitted from the headend to both the server and the given client-receiver, and wherein responsive to the server receiving the validation-message, the server determines whether the given client-receiver is a valid client-receiver of the subscriber television system using at least a portion of the authentication-token and at least a portion of the validator.

2. A method of validating a client-receiver in a digital networks, the digital network having a headend, a plurality of client-receivers for receiving programming from the headend and the server, and a server in communication with the headend and with the plurality of client-receivers, the server and the plurality of client-receivers located at a client location remote from the headend, the method comprising the steps of:

receiving by the server a validation-message from a particular client-receiver of the plurality of client-receivers, the validation-message including a message content and a first authentication-token generated by the particular client-receiver, wherein the message content includes at least a client-identifier and the first authentication-token is the output of a one-way function having at least a portion of a validator and at least a portion of the client-identifier of the message content of the validation-message as inputs, wherein the validator is known to the particular client-receiver and other client-receivers of the plurality of client-receivers;

generating by the server a local authentication-token using the message content, wherein the local authentication-token is the output of a one-way function having at least a portion of the validator as an input; and determining by the server whether the particular client-receiver is a valid client-receiver of the digital network using at least the first and local authentication-tokens by comparing the first authentication token and the local authentication-token to determine if they are the same.

3. The method of claim 2, wherein the digital network is a subscriber television system, the validator is a shared-secret, and the shared-secret is implemented by the server to decrypt services of the subscriber television system.

4. The method of claim 2, further including the steps of:

prior to said receiving, generating and determining steps, receiving by the server the validator in a secure-message from a headend, wherein the validator is encrypted using a public-key of a private-key/public-key pair belonging to the server;

decrypting the encrypted validator using the private-key of the private-key/public-key pair belonging to the server; and storing the decrypted validator in a memory of a secure-element, wherein the secure-element includes a processor and the memory is accessible to only the processor, and wherein the private-key of the private-key/public-key pair belonging to the server is stored in the memory.

5. The method of claim 4 wherein the secure-message is further comprised of a digest that has been processed by digitally signing the digest at the headend which converts a value of the digest from an original value to a different value, the method further including the steps of:

generating a local message-authenticator, wherein the local message-authenticator is an output of a one-way function having at least a portion of the decrypted validator as an input;

changing the different value of the digest included in the secure-message to its original value with a public-key of a private-key/public-key belonging to the headend to generate a reprocessed digest; and comparing the local message-authenticator and the reprocessed digest to see if they are the same, wherein the steps of generating the authentication-token and determining whether the particular client-receiver is a valid client-receiver of the subscriber television system are done only if the local message-authenticator and the reprocessed digest are the same.

6. The method of claim 2, wherein the message content of the validation message further comprises a second authentication-token, the method further including the step of:

comparing the second local authentication-token and the second authentication-token, wherein the step of determining whether the particular client-receiver is a valid client-receiver of the subscriber television system is done only if the local authentication-token and the second authentication-token are the same.

7. The method of claim 2, further including the step of:

responsive to determining the particular client-receiver is valid, providing the particular client-receiver with an instance of service.

* * * * *